US010057908B2

(12) United States Patent
Sutskover et al.

(10) Patent No.: US 10,057,908 B2
(45) Date of Patent: Aug. 21, 2018

(54) TRIGGER FRAME FOR SOUNDING IN A WIRELESS NETWORK

(71) Applicant: Intel IP Corporation, Santa Clara, CA (US)

(72) Inventors: Ilan Sutskover, Hadera (IL); Chittabrata Ghosh, Fremont, CA (US); Yaron Alpert, Hod Hasharoni (IL)

(73) Assignee: Intel IP Corporation, Santa Clara, CA (US)

( * ) Notice: Subject to any disclaimer, the term of this patent is extended or adjusted under 35 U.S.C. 154(b) by 68 days.

(21) Appl. No.: 15/078,677

(22) Filed: Mar. 23, 2016

(65) Prior Publication Data

US 2017/0118764 A1  Apr. 27, 2017

Related U.S. Application Data

(60) Provisional application No. 62/244,307, filed on Oct. 21, 2015.

(51) Int. Cl.
| | |
|---|---|
| *H04W 72/08* | (2009.01) |
| *H04L 5/00* | (2006.01) |
| *H04B 7/04* | (2017.01) |
| *H04W 84/12* | (2009.01) |
| *H04B 7/0417* | (2017.01) |

(52) U.S. Cl.
CPC ........ *H04W 72/085* (2013.01); *H04B 7/0417* (2013.01); *H04L 5/006* (2013.01); *H04L 5/0007* (2013.01); *H04W 84/12* (2013.01)

(58) Field of Classification Search
None
See application file for complete search history.

(56) References Cited

U.S. PATENT DOCUMENTS

2016/0262051 A1* 9/2016 Merlin .................. H04L 5/0057
2017/0070914 A1* 3/2017 Chun .................... H04L 1/0026

* cited by examiner

*Primary Examiner* — Yaotang Wang
(74) *Attorney, Agent, or Firm* — Schwegman Lundberg & Woessner, P.A.

(57) ABSTRACT

Methods, apparatuses, computer readable media for trigger frames for sounding in a wireless network. An apparatus of a wireless device is disclosed, which includes processing circuitry configured to: encode a null data packet (NDP) announcement (NDP-A) including an indication of stations, configure the wireless device to transmit the NDP-A, and encode a high-efficiency (HE) NDP. The processing circuitry may be further configured to configure the wireless device to transmit the HE-NDP and encode a trigger frame (TF) including feedback parameters for the stations and a resource allocation for each of the stations to transmit a feedback report to the wireless device. The feedback report is based on the feedback parameters and the HE-NDP. The processing circuitry may be further configured to configure the wireless device to transmit the trigger frame, and decode the feedback reports from the stations in accordance with the corresponding resource allocation and the feedback parameters.

22 Claims, 7 Drawing Sheets

TRIGGER FRAME FOR SOUNDING IN A WIRELESS NETWORK

PRIORITY CLAIM

This application claims the benefit of priority under 35 USC 119(e) to U.S. Provisional Patent Application Ser. No. 62/244,307, filed Oct. 21, 2015, which is incorporated herein by reference in its entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to trigger frames for sounding in wireless networks. Some embodiments relate to wireless local area network (WLAN).

BACKGROUND

Efficient use of the resources of a wireless local-area network (WLAN) is important to provide bandwidth and acceptable response times to the users of the WLAN. However, often there are many devices trying to share the same resources and the devices may interfere with one another. Additionally, the wireless devices may be moving and the signal quality may be changing. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
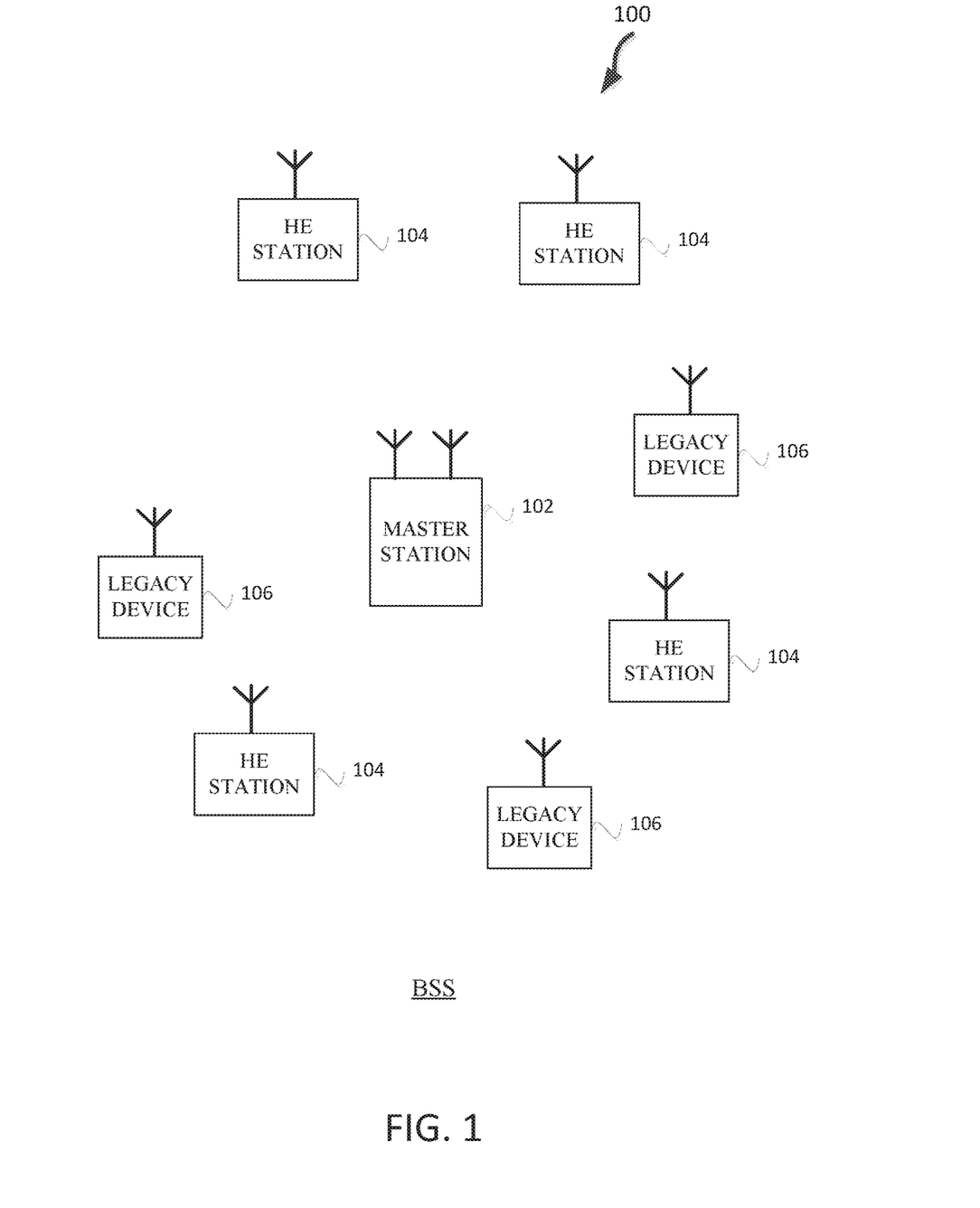
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of a extended service set (ESS). A controller may store information that is common to the more than one master stations 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, or 242 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones for a 242 point Fast Fourier Transform (FFT).

A HE frame may be configured for transmitting a number of spatial streams, which may be in accordance with MU-MIMO and may be in accordance with OFDMA. In other embodiments, the master station 102, HE STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the master-sync transmission the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE control period in accordance with legacy IEEE 802.11 communication techniques, although this is not a requirement.

In some embodiments the HE station 104 may be a "group owner" (GO) for peer-to-peer modes of operation. A wireless device may be HE station 102 or a master station 102.

In example embodiments, the HE device 104 and/or the master station 102 are configured to perform the methods and functions herein described in conjunction with FIGS. 1-7.

Figure 2:
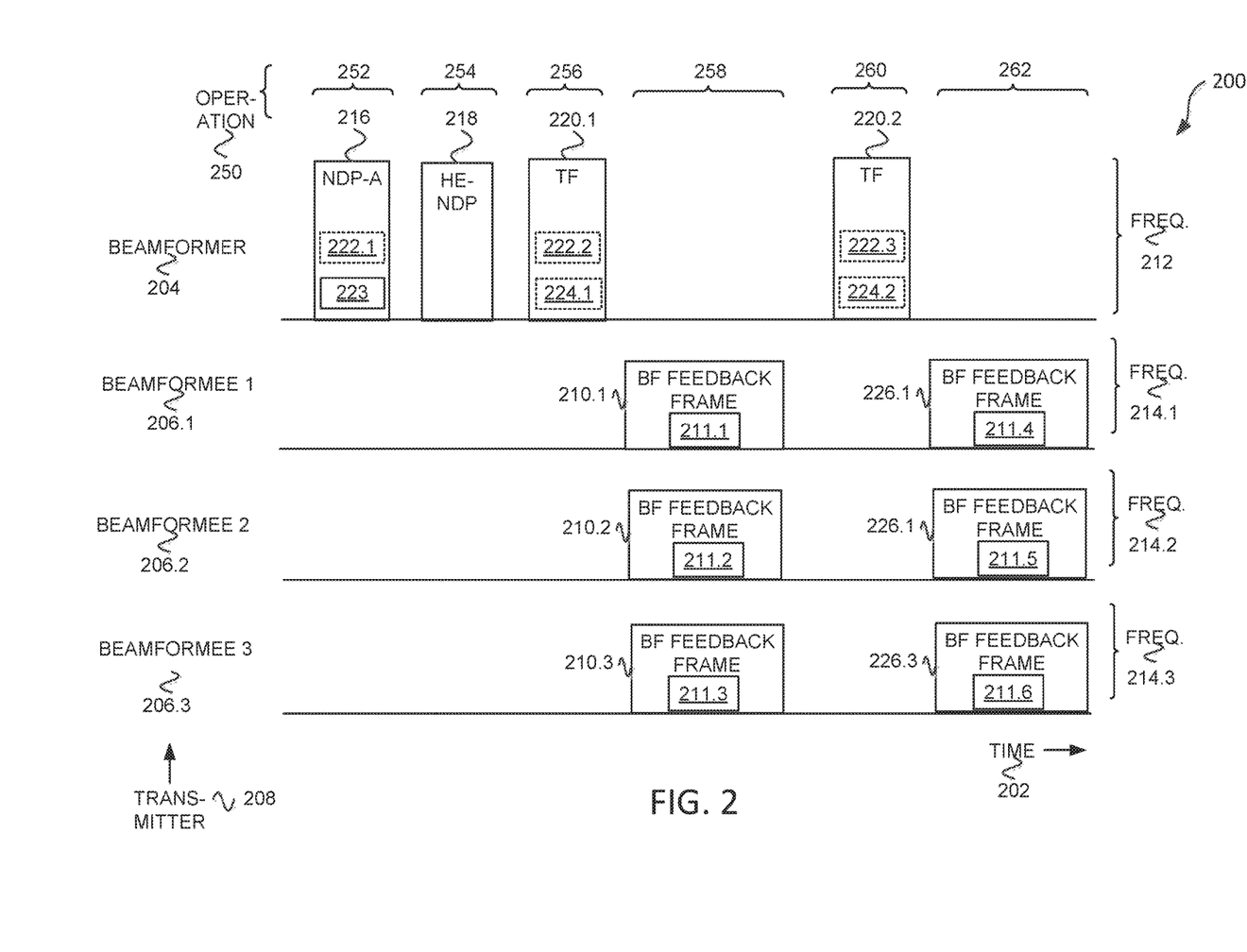
FIG. 2 illustrates a method for sounding in a wireless network in accordance with some embodiments.

FIG. 2 illustrates a method 200 for sounding in a wireless network in accordance with some embodiments. Illustrated in FIG. 2 is time 202 along a horizontal axis, frequency 212, 214 along a vertical axis, transmitter 208, and operation 250 along the top. The transmitter 208 may be a beamformer 204 or beamformee 206. The beamformer 204 may be a HE station 104 or a master station 102. Each beamformee 1 206.1, beamformee 2 206.2, and beamformee 3 206.3 may be a HE stations 104 or a master station 102. The frequency 212 may be a primary channel. The frequency 212 may be channel, e.g. 20 MHz, 40 MHz, 80 MHz, 160 MHz, 320 MHz, or another bandwidth. The frequencies 214 may be a channel with a bandwidth that may be 20 MHz or less, or another bandwidth greater than 20 MHz (e.g., 40 MHz, 80 MHz, 160 MHz).

The method 200 may begin at operation 252 with the beamformer 204 transmitting a null data packet announcement (NDP-A) 216 packet. The NDP-A 216 may be transmitted on a channel with a bandwidth of frequency 212. The frequency 212 may be a primary channel. The frequency 212 may be 80 MHz or another bandwidth. The NDP-A 216 may comprise feedback parameters 222.1 and station indication 223. The feedback parameters 222.1 (e.g., feedback parameters 300) may be optional in the NDP-A 216. The feedback parameters 222 may be transmitted to the beamformees 206 in an information element (IE) in a packet before the TF 220.

The station indication 223 may include an identification of one or more beamformees 206, e.g. association identifications (AIDs), for beamformee 1 206.1, beamformee 2 206.2, and beamformee 3 206.3. There may be legacy station 106, other master station 102, and/or other HE stations 104 that receive the NDP-A 216 and determine they are not to participate in the method 200 for sounding in the wireless network because they are not identified in the station indication 223. In some embodiments.

The method 200 may continue at operation 254 with the beamformer 204 transmitting a HE null data packet (HE-NDP). The HE-NDP 218 may have no data field present in the physical layer payload. The HE-NDP 218 is received by the beamformees 206 and used by the physical (PHY) layer for beamforming setup, measurement, and tuning. The beamformees 206 may generate a feedback data (not illustrated) based on the HE-NDP 218. Portions of the feedback data may be extracted to form feedback reports 211.

The method 200 may continue at operation 256 with the beamformer 204 transmitting a trigger frame (TF) 220. The TF 220 may be transmitted a short inter-frame space (SIFS) after the HE-NDP 218. The TF 220 may comprise a resource allocation 224 and/or feedback parameters 222.2 (e.g., feedback parameters 300). The resource allocation 224 may comprise an indication of station identification and channel for the beamformee 206 to transmit on. Resource allocation 224 may additionally include a duration and other parameters such as modulation and coding scheme (MCS), power to use to transmit, etc. The resource allocation 224 may be a multi-user (MU) uplink (UL) resource allocation 224, e.g. MU-MIMO and/or OFDMA. The feedback parameters 222.2 may be optional.

There may be one feedback parameters 300 per beamformee 206 encoded in feedback parameters 222. The TF 220 may be a frame that indicates the beamformees 206 are to transmit in accordance with the resource allocation 224, e.g. the TF 220 may be clear-to-send that indicates it is also a trigger frame. The beamformer 204 may determine based on the feedback parameters 222.1 and/or 222.2 the resource allocation 224 to be large enough to accommodate the feedback report 211. For example, beamformer 204 may determine a resource allocation for each of the beamformees 206 that is sufficient for the beamformees 206 to transmit the respective feedback report 211.2. The feedback reports 211.2 may be of a different size so that the resource allocations 224 may be different and in accordance with the size of the respective feedback report 211.

The method 200 may continue at operation 258 with the beamformees 206 transmitting beamforming feedback frames 210 in accordance with the resource allocation 224.1. For example, each beamformee 206 may be allocated 26 data tones and a duration that is sufficient to transmit the beamforming feedback frames 210 with the beamforming feedback reports 211.

The beamforming feedback frames 210 may include feedback reports 211. The beamformees 206 estimate the channel based on the HE-NDP 218. The beamformees 206 may then generate the feedback reports 211 in accordance with the feedback parameters 222.1 and/or feedback parameters 222.2 based on the estimate of the channel based on the HE-NDP 218.

The feedback reports 211 may be partial feedback reports 211 that are part of a full report that the beamformees 206 generate based on the HE-NDP 218.

Optionally, the method 200 may continue at operation 260 with the beamformer 204 transmitting a second TF 220.2. The TF 220.2 may comprise feedback parameters 222.3 and resource allocation 224.2. The feedback parameters 222.3 may be different than the feedback parameters 222.1 and 222.2. In some embodiments, the beamformer 204 may request a coarse report with feedback parameters 222.2 and then a finer report in feedback parameters 222.3 for a portion of the bandwidth determined to be of interest based on the BF feedback frames 210.

For example, the feedback parameters 222.2 may indicate Ng=16 (see grouping 306 of FIG. 3 for a disclosure of Ng) for a 80 MHz BW, and feedback parameters 222.3 may indicate Ng=2 for a 20 MHz bandwidth. In some embodiments Ng=16 may be considered a more coarse report than Ng=2, and Ng=2 may be considered a finer report than Ng=16. In this way the resource allocations 224.1 may be smaller for the beamformer 204 to find the 20 MHz bandwidth of interest and then get a fuller report on the 20 MHz bandwidth with the feedback parameters 222.3. This may make the resource allocation 224.2 smaller for the beamformee 206 as the more detailed report with Ng=2 is only provided for 20 MHz bandwidth and not 80 MHz bandwidth. The ability of the beamformer 206 to select the feedback parameters 222 and conduct multiple rounds of TF 220 may increase the efficiency of the use of the wireless network. The beamformer 204 may determine a size of a resource allocation 224.2 needed for the beamformees 206 to transmit the feedback report 211 generated based on the feedback parameters 222.3.

The method 200 may continue at operation 262 with the beamformees 206 transmitting beamforming feedback frames 220 in accordance with the resource allocation 224.2. For example, each beamformee 206 may be allocated a 4.06 MHz channel and a duration that is sufficient to transmit the beamforming feedback frames 220 with the beamforming feedback reports 211.

The beamforming feedback frames 226 may include feedback reports 211. The beamformees 206 estimate the channel based on the HE-NDP 218 and generates feedback data. The beamformees 206 may then generate the feedback reports 211 in accordance with the feedback parameters 222.1, 222.2, and/or 222.3 based on the feedback data, which is generated based on receiving HE-NDP 218. For example, feedback reports 211.1, 211.2, and 211.3 may be based on feedback parameters 222.2. The beamformees 206 may extract a portion of the feedback data based on the parameters 222.2 to generate the feedback reports 211. As another example, feedback reports 211.4, 211.5, and 211.6 may be based on feedback parameters 222.3 and the feedback data generated based on receiving HE-NDP 218.

In some embodiments, the beamformees 206 process the HE-NDP 218 with a minimum grouping (Ng) (e.g., 1 or 4) to generate feedback data. In some embodiments, the beamformee 206 processes the HE-NDP 218 with a maximum number of spatial streams to generate feedback data. In some embodiments, the beamformee 206 may process the HE-NDP 218 based on the feedback parameters 222.1 which may indicate a grouping that is not the minimum grouping and a number of spatial streams that is not the maximum number of spatial streams. This may reduce the processing for the beamformee 206.

The feedback reports 211 may be partial feedback data that are extracted from feedback data that the beamformees 206 generates based on the HE-NDP 218. The feedback reports 211.4, 211.5, and 211.6 may be refinements of the corresponding feedback reports 211.1, 211.2, and 211.3. As another example, the feedback parameters 222.1, 222.2, and/or 222.3 may include two or more spatial streams and the corresponding feedback parameters 222.4, 222.5, and/or 222.6 may be for just a strongest spatial stream selected by the beamformer 204 based on the feedback reports 211 from the feedback parameters 222.1, 222.2, and/or 222.3. As another example, feedback reports 211.1, 211.2, and 211.3 may be subsets of the feedback data of the estimate of the channel based on the HE-NDP 218 where the feedback parameters 222.2 may indicate maximum parameters (e.g., Ng=1 or 4, and number of spatial streams equal to maximum). The feedback reports 211.4, 211.5, and 211.6 may be a different subset of the feedback data based on the HE-NDP 218 than feedback reports 211.1, 211.2, and 211.3. As another example, the feedback reports 211.4, 211.5, and 211.6 may be an overlapping subset of feedback reports 211.1, 211.2, and 211.3. As another example, feedback parameters 222.2 may include 80 MHz with Ng=16, and feedback parameters may include 20 MHz (where the 20 MHz bandwidth is within the 80 MHz bandwidth) and Ng=4. So, in this case, feedback reports 211.1, 211.2, and 211.3 and feedback reports 211.4, 211.5, and 211.6 would include a portion that is common to both, and portions that the other ones do not include. The feedback reports 211 are extracted from the feedback data generated by the beamformee 206 based on receiving the HE-NDP 218.

The method 200 may end or the method 200 may continue with additional TFs 220 and additional BF feedback frames (not illustrated) being transmitted. The beamformer 204 may iterate with TFs 220 and additional BF feedback frames (not illustrated) until the beamformer 204 has determined channels and/or spatial streams to use for the beamformees 206. The beamformer 204 may generate steering matrixes for beamforming based on the feedback reports 211. In some embodiments, a number of the additional TFs 220 and additional BF feedback frames (not illustrated) may be limited to the coherence time of the HE-NDP 218.

Figure 3:
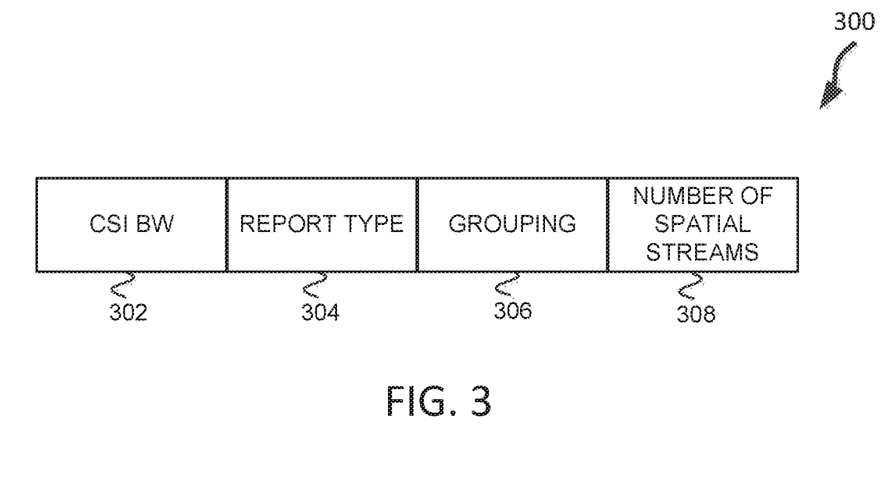
FIG. 3 illustrates feedback parameters in accordance with some embodiments.

FIG. 3 illustrates feedback parameters 300 in accordance with some embodiments. The feedback parameters 300 may comprise channel state information (CSI) bandwidth (BW) 302, report type 304, grouping (Ng) 306, and number of spatial streams 308. The beamformees 206 (FIG. 2) may take the feedback parameters 300 to generate the beamforming feedback frames 210, 226.

The CSI BW 302 may be the portion of spectrum with respect to which the feedback is requested. For example, beamformer 204 may transmit the HE-NDP 218 on a channel of 80 MHz. The beamformees 206 may estimate the channel over the entire 80 MHz. The CSI BW 302 may indicate a bandwidth that is narrower than the 80 MHz. For example, a bandwidth of 2.03 MHz, 2.5 MHz, 4.06 MHz, or 20 MHz. The beamformees 206 may then generate a beamforming feedback frame 210 with feedback only for the BW indicated by the CSI BW 302.

The report type 304 may indicate a type of beamforming feedback report. For example, the report type 304 may be for signal to noise rations (SNRs) or per tone feedback with a steering matrix for a tone grouping 306 (Ng). The tone feedback may include per tone calculations such as angles.

Grouping 306 (Ng) may indicate which tones in the CSI bandwidth 302 to generate the feedback report 211 for. The grouping 306 (Ng) may be with respect to OFDM or OFDMA tones. The grouping 306 (Ng) may indicate a ratio of feedback tones vs. tones to be ignored. For example, Ng=4 may mean generating the feedback report 211 for every fourth tone only. In some embodiments, Ng may be 1 or another number that is less than a number of tones of the CSI BW 302.

The number of spatial streams (Nc) 308 may indicate a number of SS to address in the feedback report 211. In some embodiments, the number of SSs 308 may indicate one or more SSs for which to generate the feedback report 221. The number of SSs 308 may indicate the maximum number of columns of the steering matrix. In some embodiments, the spatial streams feedback is ordered according to their SNR (per subcarrier). In some embodiments, if Nc 308 is less than the maximum number of SS, then this may mean for the beamformee 206 to select the vectors corresponding to the strongest SNR (among the streams) for each subcarrier.

In some embodiments, the HE-NDP 218 may be transmitted on a 80 MHz channel. The beamformees 206 may estimate the channel over the entire 80 MHz bandwidth. The feedback parameters 300 (222 in FIG. 2) may indicate a partial feedback report for the beamformees 206 to transmit back to the beamformer 204.

For example, CSI BW 302=20 MHz, report type 304=SNR only, grouping 306=16 Ng, and number of SS 308=1. As another example, CSI BW 302=80 MHz, report type 304=per tone feedback with a steering matrix for a tone grouping 306 (Ng) grouping 306=2 Ng, and number of SS 308=4.

The size of the feedback report 211 depends on the feedback parameters 300 (222 in FIG. 2). For example, a feedback report 211 may be 200-500 μseconds (sec). The overhead of transmitting a report of this size may reduce the efficiency of the wireless network. The coherence time may be a few msec. The coherence time may be an amount of time that the feedback report 211 is valid before the channel conditions may change.

The feedback parameters 300 (222 in FIG. 2) may be per beamformee 206. There may be one feedback parameters 300 (222 in FIG. 2) per beamformee 206. The beamformer 204 may generate multiple feedback parameters 300 for a beamformee 206 to send in different TFs 220.

Figure 4:
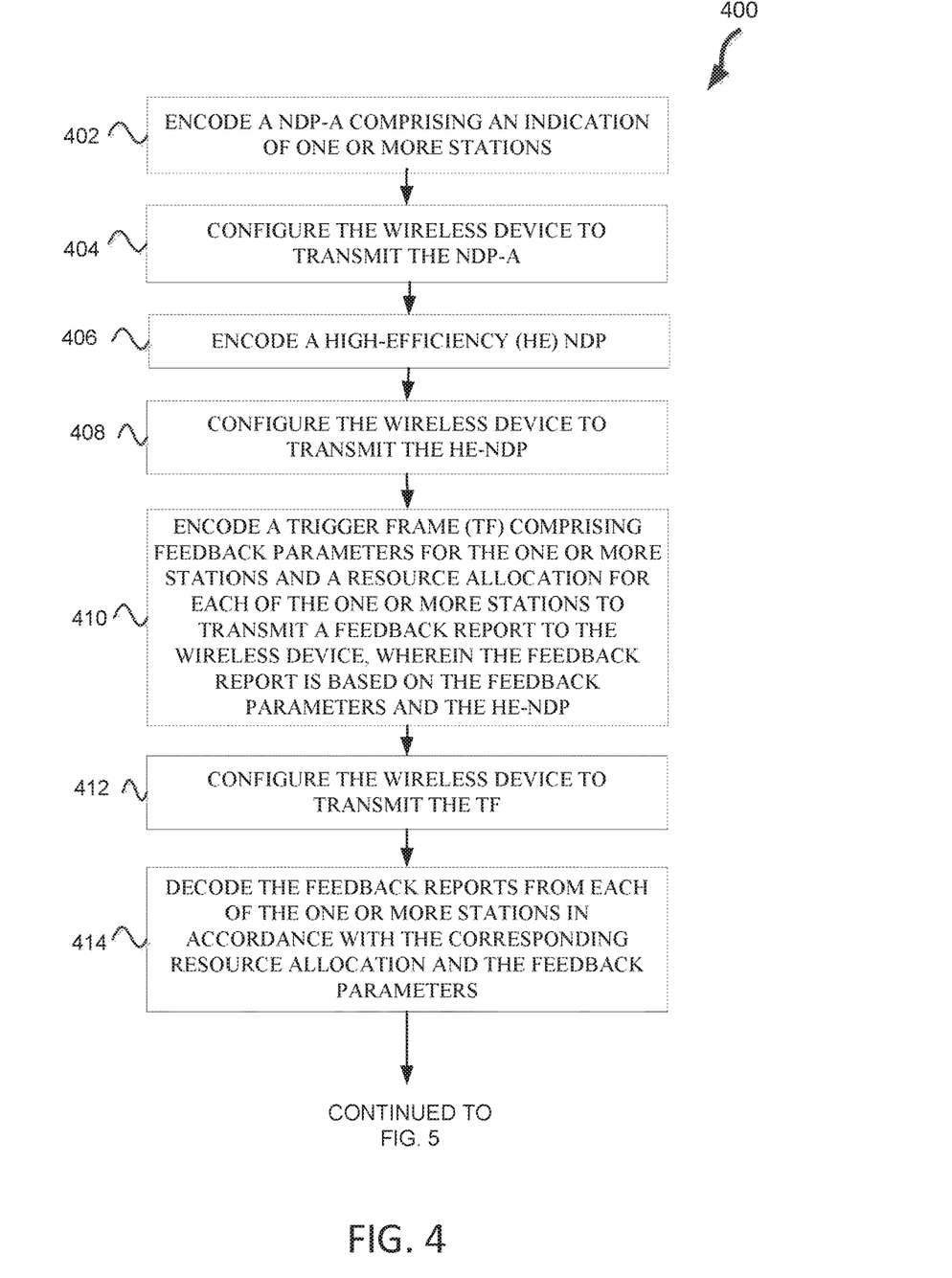
FIGS. 4 and 5 illustrate a method for trigger frames for sounding in a wireless network in accordance with some embodiments.
Figure 5:
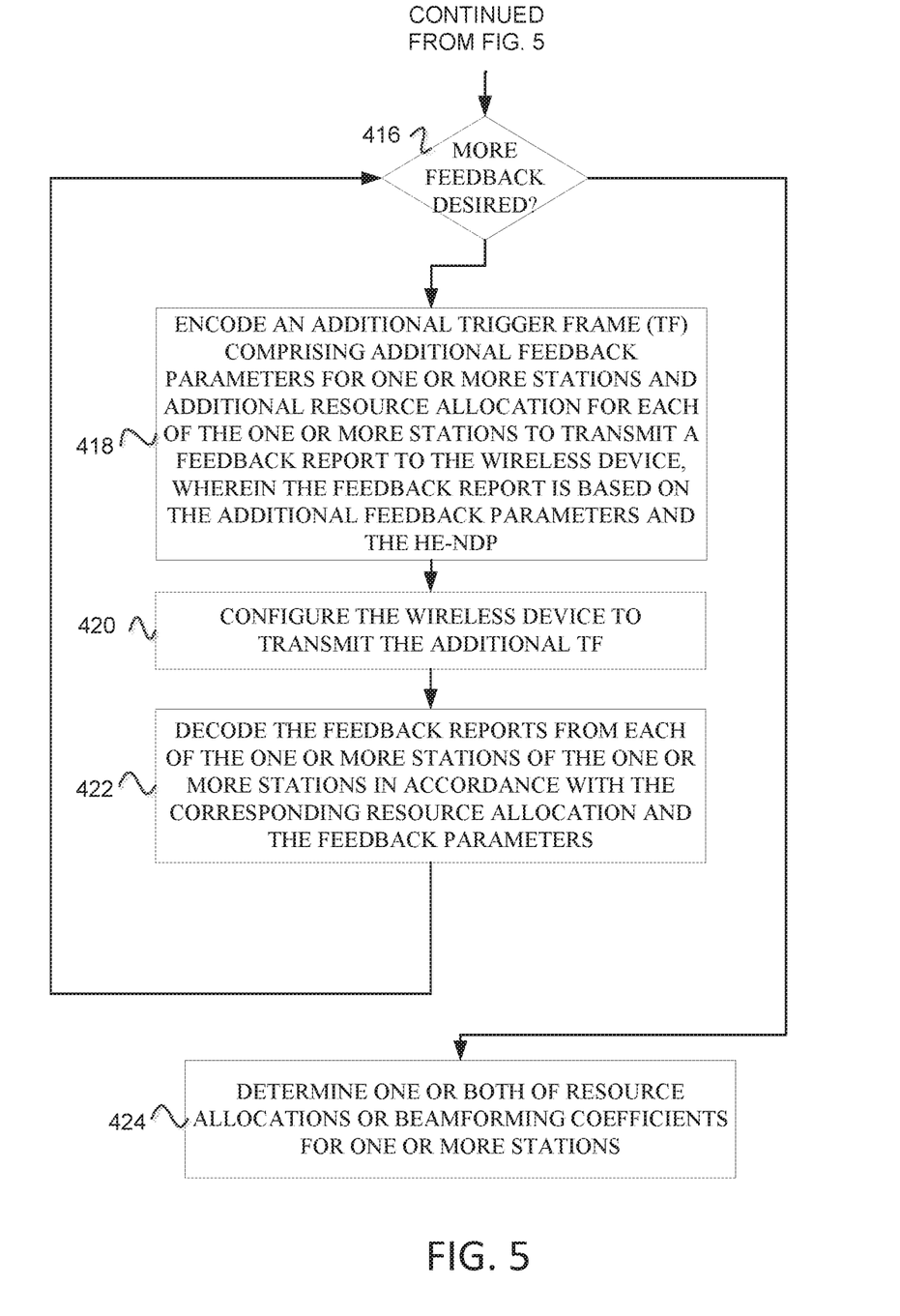

FIGS. 4 and 5 illustrate a method 400 for trigger frames for sounding in a wireless network in accordance with some embodiments. The method 400 may begin at operation 402 with encoding a null data packet (NDP) announcement (NDP-A) comprising an indication of one or more stations. For example, an apparatus of the beamformer 204 may encode NDP-A 216 as described in conjunction with FIG. 2. As another example, the machine 700 may encode an NDP-A and a portion of the machine 700 may be the apparatus.

The method 400 may continue at operation 404 with configuring the wireless device to transmit the NDP-A. For example, an apparatus of the beamformer 204 may configure the beamformer 204 to transmit the NDP-A 216 as described in conjunction with FIG. 2.

The method 400 may continue at operation 406 with encoding a high-efficiency (HE) NDP. For example, an apparatus of the beamformer 204 may encode HE-NDP 218 as described in conjunction with FIG. 2.

The method 400 may continue at operation 408 with configuring the wireless device to transmit the HE-NDP. For example, an apparatus of the beamformer 204 may configure the beamformer 204 to transmit the HE-NDP 218.

The method 400 may continue at operation 410 with encoding a trigger frame (TF) comprising feedback parameters for the one or more stations and a resource allocation for each of the one or more stations to transmit a feedback report to the access point, wherein the feedback report is based on the feedback parameters and the HE-NDP. For example, an apparatus of the beamformer 204 may encode the TF 220 as described in conjunction with FIG. 2.

The method 400 may continue at operation 412 with configuring the wireless device to transmit the trigger frame. For example, an apparatus of the beamformer 204 may configure the beamformer 204 to transmit the TF 220.

The method 400 may continue at operation 414 with decoding the feedback reports from each of the one or more stations in accordance with the corresponding resource allocation and the feedback parameters. For example, an apparatus of the beamformer 204 may decode the feedback reports as described in conjunction with FIG. 2.

The method 400 may continue at operation 416 with determining whether more feedback is desired. For example, an apparatus of the beamformer 204 may determine whether the feedback reports 211.1, 211.2, and 211.3 are sufficient to determine a resource allocation for beamformees 206 and/or beamforming coefficients, or whether an additional feedback report 211.4, 211.5, and 211.6 is desired. In some embodiments, the beamforming coefficients may be used by the beamformer 204 for downlink transmissions (which may be MU transmission) to the beamformees 206.

The method 400 may continue at operation 418 with encoding an additional trigger frame (TF) comprising additional feedback parameters for one or more stations and additional resource allocation for each of the one or more stations to transmit a feedback report to the access point, wherein the feedback report is based on the additional feedback parameters and the HE-NDP. For example, an apparatus of beamformer 204 may determine new feedback parameters 222.3 which may be based on feedback parameters 222.1 and/or feedback parameters 222.2, and/or feedback reports 211.1, 211.2, 211.3. For example, feedback parameters 222.2 may be a refinement of feedback parameters 222.1 (e.g., Ng=2 rather than Ng=16, or BW=20 rather than BW=80). The feedback parameters 222.1, in some embodiments, may determine how the beamformees 206 perform the sounding of the HE-NDP 218 (e.g., only Ng=4, or only BW=20).

The method 400 may continue at operation 420 with configuring the wireless device to transmit the additional TF. For example, an apparatus of the beamformer 204 may configure the beamformer 204 to transmit the TF 220.2.

The method 400 may continue at operation 422 with decoding the feedback reports from each of the one or more stations of the one or more stations in accordance with the corresponding resource allocation and the feedback parameters. For example, an apparatus of the beamformer 204 may decode the feedback reports 211.4, 211.5, and 211.6.

In operations 418, 420, 422 an apparatus of the beamformer 204 may select some of the initial stations and only request additional feedback reports from one or more of the initial stations.

The method 400 may return to operation 416 with again determining whether more feedback is desired. If the answer is yes, then the method 400 may iterate again through the operations 418, 420, 422.

If the answer is no, then the method 400 may continue to operation 424 with determining one or both of a resource allocation or beamforming coefficients for one or more stations. For example, an apparatus of the beamformer 204 may determine a resource allocation (not illustrated) for the beamformees 206 for a next transmission opportunity (not illustrated). The method 400 may end.

Figure 6:
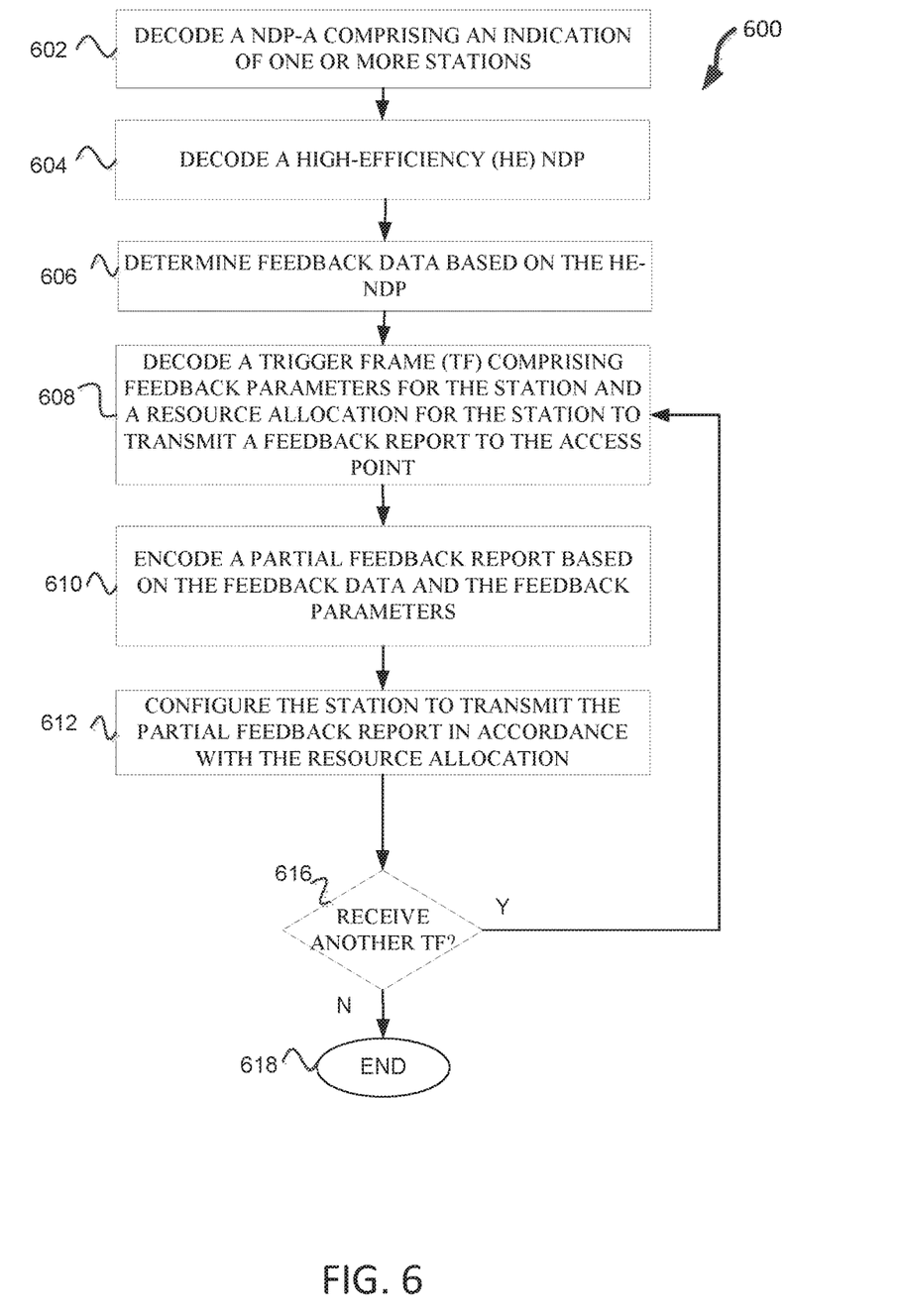
FIG. 6 illustrates a method for trigger frames for sounding in a wireless network in accordance with some embodiments.

FIG. 6 illustrates a method 600 for trigger frames for sounding in a wireless network in accordance with some embodiments. The method 600 may begin at operation 602 with decode a null data packet (NDP) announcement (NDP-A) comprising an indication of the station. For example, an apparatus of a beamformee 1 206.1 may decode NDP-A which may comprise an indication of a station 223 that includes a station of the apparatus.

The method 600 may continue at operation 604 with decoding a high-efficiency (HE) NDP. For example, an apparatus of the beamformee 1 206.1 may decode HE-NDP 218.

The method 600 may continue at operation 606 with determining feedback data based on the HE-NDP. For example, the beamformees 206 may generate the feedback data (not illustrated) based on the HE-NDP (e.g. 218). The feedback data may be a database of feedback data generated by the beamformees 206 based on the HE-NDP. The beamformees may generate a feedback report (e.g., feedback reports 211.1 through 211.6) from a portion of the feedback data based on feedback parameters (e.g., 222.2 and 222.3), which may be included in a trigger frame. In some embodiments, the feedback data may be comprehensive feedback based on the received HE-NDP. The feedback data may include the feedback the beamformee (e.g. 206) can generate based on the HE-NDP. For example, the beamformee (e.g., 206) may receive the HE-NDP, and for each orthogonal frequency-division multiplexing (OFDM) subcarrier, store feedback data that describes the performance of the subcarrier between each transmitter antenna element (of the beamformer) and each receiver antenna element (of the beamformee). Additional feedback data may be stored. An apparatus of a beamformee 1 206.1 may determine the feedback data. In some embodiments, the feedback data may be based on one or more standards (e.g., IEEE 802.11ax). In some embodiments, the beamformee 206 generates and stores the feedback data in preparation to generate feedback reports (e.g., 211.1 through 211.6) to respond to feedback parameters (e.g., 222.2 and (16) 222.3.)

The method 600 may continue at operation 608 with decoding a trigger frame (TF) comprising feedback parameters for the station and a resource allocation for the station to transmit a feedback report to the access point. For example, beamformee 1 206.1 may decode TF 220.1 that may comprise feedback parameters 222.2 and a resource allocation 224.1.

The method 600 may continue at operation 610 with encoding a partial feedback report based on the feedback data and the feedback parameters. For example, beamformee 1 206.1 may generate feedback report 211.1 based the feedback parameters 222.2, which may determine a portion of the feedback data (generated from the HE-NDP 218) to use to generate the feedback report 211.1.

The method 600 may continue at operation 612 with configuring the station to transmit the partial feedback report in accordance with the resource allocation. For example, an apparatus of beamformee 1 206.1 may configure the beamformee 1 206.1 to transmit the feedback report 211.1 to the beamformer 204.

The method 600 may continue at operation 616 with receive another TF. If another TF is not received, then the method 600 may end at operation 618. If another TF is received, then the method 600 may return to operation 608. The operations 608, 610, 612, and 614 may be repeated one or more times.

Figure 7:
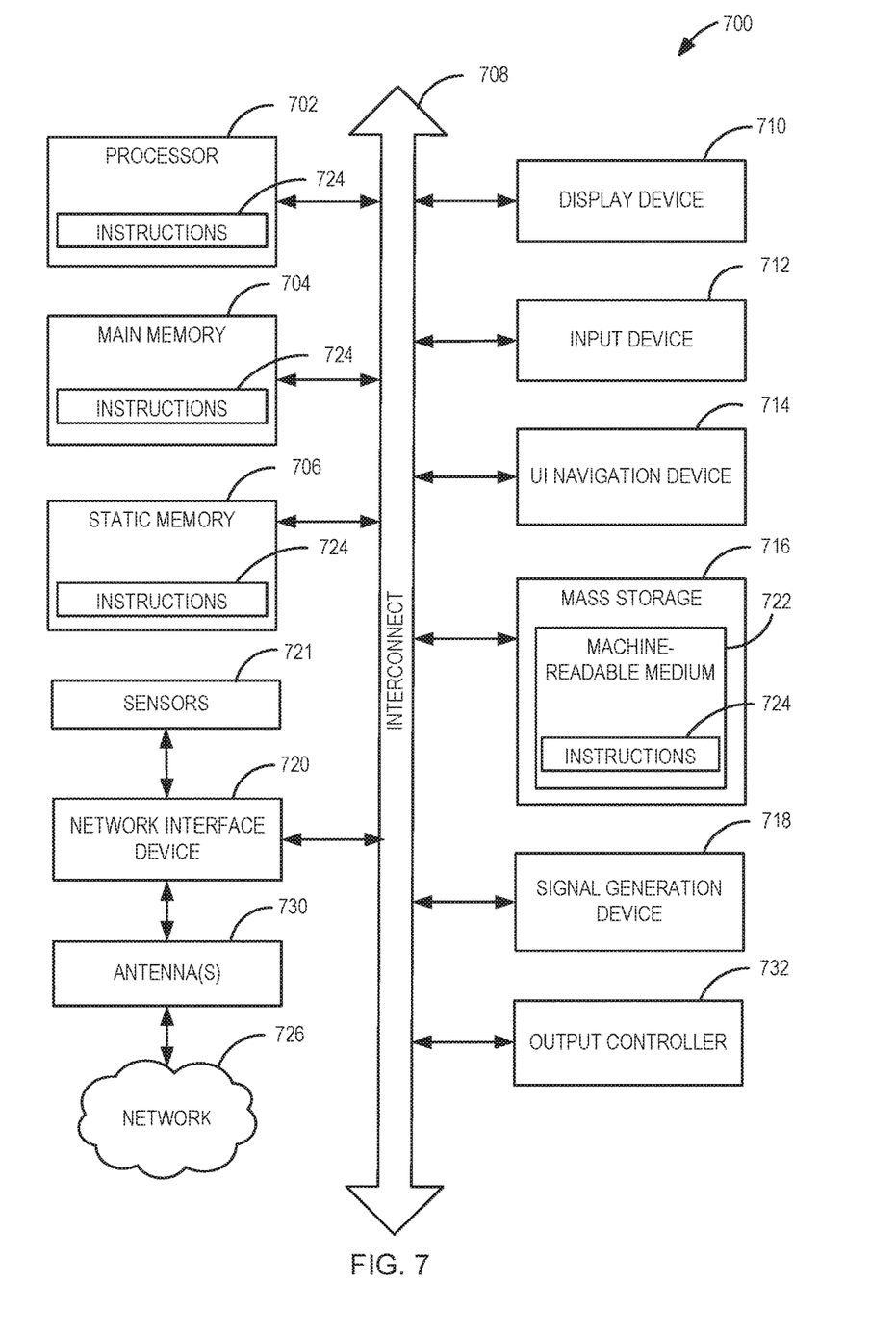
FIG. 7 illustrates a block diagram of an example machine upon which any one or more of the techniques (e.g., methodologies) discussed herein may perform.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display.

The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 702 and/or instructions 724 may comprise processing circuitry.

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media.

Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726.

In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Specifics in the examples may be used in one or more embodiments. Example 1 is an apparatus of a wireless device including a memory, and processing circuitry couple to the memory, where the processing circuitry is configured to: encode a null data packet (NDP) announcement (NDP-A) including an indication of one or more stations, configure the wireless device to transmit the NDP-A, encode a high-efficiency (HE) NDP, configure the wireless device to transmit the HE-NDP, encode a trigger frame (TF) including feedback parameters for the one or more stations and a resource allocation for each of the one or more stations to transmit a feedback report to the wireless device, where the feedback report is based on the feedback parameters and the HE-NDP, configure the wireless device to transmit the trigger frame, and decode the feedback reports from each of the one or more stations in accordance with the corresponding resource allocation, and where the feedback reports are in accordance with the feedback parameters.

In Example 2, the subject matter of Example 1 can optionally include where the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

In Example 3, the subject matter of Examples 1 or 2 can optionally include where the processing circuitry is further configured to: encode a second TF including second feedback parameters for one or more of the one or more stations and a second resource allocation for the one or more of the one or more stations to transmit a second feedback report to the wireless device, where the second feedback report is based on the second feedback parameters and the HE-NDP, configure the wireless device to transmit the second trigger frame, and decode the second feedback reports from each of the one or more of the one or more stations in accordance with the corresponding second resource allocation and the second feedback parameters.

In Example 4, the subject matter of Example 3 can optionally include where the processing circuitry is further configured to: determine the second feedback parameters based on the feedback reports from each of the one or more stations, and encode the second TF including second feedback parameters for each of the one or more of the one or more stations and the second resource allocation for the one or more of the one or more stations to transmit the second feedback report to the wireless device, where the second feedback report is based on the second feedback parameters and the HE-NDP.

In Example 5, the subject matter of Example 4 can optionally include where the second feedback parameters comprise at least one of the following: a narrower bandwidth than the feedback parameters, a smaller grouping (Ng) with respect to OFDM tones, or a different report type.

In Example 6, the subject matter of any of Examples 1-5 can optionally include where the resource allocation indicates a multi-user resource allocation in accordance with one or both of multi-user multiple-input multiple-output (MU-MIMO) or orthogonal frequency division multiple access (OFDMA).

In Example 7, the subject matter of any of Examples 1-6 can optionally include where the processing circuitry is further configured to: determine the resource allocation based on a size of the feedback reports.

In Example 8, the subject matter of any of Examples 1-7 can optionally include where the NDP-A further comprises third feedback parameters and where the feedback report is further based on the third feedback parameters.

In Example 9, the subject matter of any of Examples 1-8 can optionally include where the processing circuitry is further configured to: configure the wireless device to transmit the trigger frame a short inter-frame space (SIFS) after the HE-NDP.

In Example 10, the subject matter of any of Examples 1-9 can optionally include where the wireless device and each of the one or more stations are one or more from the following group: an access point, an Institute of Electrical and Electronic Engineers (IEEE) 802.11ax access point, a station, a station acting as a group owner (GO), and an IEEE 802.11ax station, and where the trigger frame is one from the following group: a trigger frame, a request-to-send (RTS) frame including an indication that the RTS frame is a trigger frame, and a trigger frame for sounding.

In Example 11, the subject matter of any of Examples 1-10 can optionally include including transceiver circuitry coupled to the memory.

In Example 12, the subject matter of Example 11 can optionally include one or more antennas coupled to the transceiver circuitry.

In Example 13, the subject matter of Examples 12 can optionally include where the processing circuitry is configured to: transmit the HE-NDP over a bandwidth as a multicast frame, where the bandwidth is one from the following group: 20 MHz, 40 MHz, 80 MHz, 160 MHz, and 320 MHz.

Example 14 is a non-transitory computer-readable storage medium that stores instructions for execution by one or more processors, the instructions to configure the one or more processors to cause a wireless device to: encode a null data packet (NDP) announcement (NDP-A) including an indication of one or more stations, configure the wireless device to transmit the NDP-A, encode a high-efficiency (HE) NDP, configure the wireless device to transmit the HE-NDP, encode a trigger frame (TF) including feedback parameters for the one or more stations and a resource allocation for each of the one or more stations to transmit a feedback report to the wireless device, where the feedback report is based on the feedback parameters and the HE-NDP, configure the wireless device to transmit the trigger frame, and decode the feedback reports from each of the one or more stations in accordance with the corresponding resource allocation and the feedback parameters.

In Example 15, the subject matter of Examples 14 can optionally include where the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

In Example 16, the subject matter of Examples 14 or 15 can optionally include where the instructions further configure the one or more processors to cause the wireless device to: encode a second TF including second feedback parameters for one or more of the one or more stations and a second resource allocation for the one or more of the one or more stations to transmit a second feedback report to the wireless device, where the second feedback report is based on the second feedback parameters and the HE-NDP, configure the wireless device to transmit the second trigger frame, and decode the second feedback reports from each of the one or more of the one or more stations in accordance with the corresponding second resource allocation and the second feedback parameters.

In Example 17, the subject matter of any of Examples 14-16 can optionally include where the instructions further configure the one or more processors to cause the wireless device to: determine the second feedback parameters based on the feedback parameters, and encode the second TF including second feedback parameters for each of the one or more of the one or more stations and the second resource allocation for the one or more of the one or more stations to transmit the second feedback report to the wireless device, where the second feedback report is based on the second feedback parameters and the HE-NDP.

In Example 18, the subject matter of any of Examples 14-17 can optionally include where the wireless device and each of the one or more stations are one or more from the following group: an access point, an Institute of Electrical and Electronic Engineers (IEEE) 802.11ax access point, a station, a station acting as a group owner (GO), and an IEEE 802.1 lax station, and where the trigger frame is one from the following group: a trigger frame, a request-to-send (RTS) frame including an indication that the RTS frame is a trigger frame, and a trigger frame for sounding.

Example 19 is an apparatus of a station including a memory, and processing circuitry couple to the memory, where the processing circuitry is configured to: decode a null data packet (NDP) announcement (NDP-A) including an indication of the station, decode a high-efficiency (HE) NDP, determine a feedback data based on the HE-NDP, decode a trigger frame (TF) including feedback parameters for the station and a resource allocation for the station to transmit a feedback report to the wireless device, extract data from the feedback data based on the feedback parameters to generate a feedback report, encode the feedback report in accordance with the resource allocation, and configure the station to transmit the feedback report in accordance with the resource allocation.

In Example 20, the subject matter of Examples 19 can optionally include where the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

In Example 21, the subject matter of Examples 19 or 20 can optionally include where the processing circuitry is further configured to: decode a second TF including second feedback parameters for the station and a second resource allocation for the station to transmit a second feedback report to the wireless device, extract data from the feedback data based on the second feedback parameters to generate a second feedback report, encode the second feedback report in accordance with the resource allocation, and configure the station to transmit the second feedback report in accordance with the second resource allocation.

In Example 22, the subject matter of any of Examples 19-21 can optionally include where the resource allocation indicates a multi-user resource allocation in accordance with one or both of multi-user multiple-input multiple-output (MU-MIMO) or orthogonal frequency division multiple access (OFDMA).

In Example 23, the subject matter of any of Examples 19-22 can optionally include transceiver circuitry coupled to the memory; and, one or more antennas coupled to the transceiver circuitry.

Example 24 is a method performed by an apparatus of an wireless device, the method including: encoding a null data packet (NDP) announcement (NDP-A) including an indication of one or more stations, configuring the wireless device to transmit the NDP-A, encoding a high-efficiency (HE) NDP, configuring the wireless device to transmit the HE-NDP, encoding a trigger frame (TF) including feedback parameters for the one or more stations and a resource allocation for each of the one or more stations to transmit a feedback report to the wireless device, where the feedback report is based on the feedback parameters and the HE-NDP, configuring the wireless device to transmit the trigger frame, and decoding the feedback reports from each of the one or more stations in accordance with the corresponding resource allocation and the feedback parameters.

In Example 25, the subject matter of Examples 24 can optionally include where the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

Example 26 is an apparatus of a wireless device, the apparatus including: means for encoding a null data packet (NDP) announcement (NDP-A) including an indication of one or more stations, means for configuring the wireless device to transmit the NDP-A, means for encoding a high-efficiency (HE) NDP, means for configuring the wireless device to transmit the HE-NDP, means for encoding a trigger frame (TF) including feedback parameters for the one or more stations and a resource allocation for each of the one or more stations to transmit a feedback report to the wireless device, where the feedback report is based on the feedback parameters and the HE-NDP, means for configuring the wireless device to transmit the trigger frame, and means for decoding the feedback reports from each of the one or more stations in accordance with the corresponding resource allocation, and where the feedback reports are in accordance with the feedback parameters.

In Example 27, the subject matter of Example 26 can optionally include where the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

In Example 28, the subject matter of Examples 26 or 27 can optionally include means for encoding a second TF including second feedback parameters for one or more of the one or more stations and a second resource allocation for the one or more of the one or more stations to transmit a second feedback report to the wireless device, where the second feedback report is based on the second feedback parameters and the HE-NDP, means for configuring the wireless device to transmit the second trigger frame, and means for decoding the second feedback reports from each of the one or more of the one or more stations in accordance with the corresponding second resource allocation and the second feedback parameters.

In Example 29, the subject matter of Example 28 can optionally include means for determining the second feedback parameters based on the feedback reports from each of the one or more stations, and means for encoding the second TF including second feedback parameters for each of the one or more of the one or more stations and the second resource allocation for the one or more of the one or more stations to transmit the second feedback report to the wireless device, where the second feedback report is based on the second feedback parameters and the HE-NDP.

In Example 30, the subject matter of Example 28 can optionally include where the second feedback parameters comprise at least one of the following: a narrower bandwidth than the feedback parameters, a smaller grouping (Ng) with respect to OFDM tones, or a different report type.

In Example 31, the subject matter of any of Examples 26-30 can optionally include where the resource allocation indicates a multi-user resource allocation in accordance with one or both of multi-user multiple-input multiple-output (MU-MIMO) or orthogonal frequency division multiple access (OFDMA).

In Example 32, the subject matter of any of Examples 26-31 can optionally include means for determining the resource allocation based on a size of the feedback reports.

In Example 33, the subject matter of any of Examples 26-32 can optionally include where the NDP-A further comprises third feedback parameters and where the feedback report is further based on the third feedback parameters.

In Example 34, the subject matter of any of Examples 26-33 can optionally include means for configuring the wireless device to transmit the trigger frame a short interframe space (SIFS) after the HE-NDP.

In Example 35, the subject matter of any of Examples 26-34 can optionally include where the wireless device and each of the one or more stations are one or more from the following group: an access point, an Institute of Electrical and Electronic Engineers (IEEE) 802.11ax access point, a station, a station acting as a group owner (GO), and an IEEE 802.11ax station, and where the trigger frame is one from the following group: a trigger frame, a request-to-send (RTS) frame including an indication that the RTS frame is a trigger frame, and a trigger frame for sounding.

In Example 36, the subject matter of any of Examples 26-35 can optionally include means for processing received radio signals and means for processing radio signals to be transmitted.

In Example 37, the subject matter of Examples 36 can optionally include means for receiving and transmitting radio signals.

In Example 38, the subject matter of Examples 37 can optionally include means for transmitting the HE-NDP over a bandwidth as a multicast frame, where the bandwidth is one from the following group: 20 MHz, 40 MHz, 80 MHz, 160 MHz, and 320 MHz.

Example 39 is a non-transitory computer-readable storage medium that stores instructions for execution by one or more processors, the instructions to configure the one or more processors to cause a station to: decode a null data packet (NDP) announcement (NDP-A) including an indication of the station, decode a high-efficiency (HE) NDP, determine a feedback data based on the HE-NDP, decode a trigger frame (TF) including feedback parameters for the station and a resource allocation for the station to transmit a feedback report to the wireless device, extract data from the feedback data based on the feedback parameters to generate a feedback report, encode the feedback report in accordance with the resource allocation, and configure the station to transmit the feedback report in accordance with the resource allocation.

In Example 40, the subject matter of Examples 39 can optionally include where the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

In Example 41, the subject matter of Examples 39 or 40 can optionally include where the instructions further configure the one or more processors to cause the station to: decode a second TF including second feedback parameters for the station and a second resource allocation for the station to transmit a second feedback report to the wireless device, extract data from the feedback data based on the second feedback parameters to generate a second feedback report, encode the second feedback report in accordance with the resource allocation, and configure the station to transmit the second feedback report in accordance with the second resource allocation.

In Example 42, the subject matter of any of Examples 39-41 can optionally include where the resource allocation indicates a multi-user resource allocation in accordance with one or both of multi-user multiple-input multiple-output (MU-MIMO) or orthogonal frequency division multiple access (OFDMA).

Example 43 is a method performed by an apparatus of a station, the method including: decoding a null data packet (NDP) announcement (NDP-A) including an indication of the station, decoding a high-efficiency (HE) NDP, determining a feedback data based on the HE-NDP, decode a trigger frame (TF) including feedback parameters for the station and a resource allocation for the station to transmit a feedback report to the wireless device, extracting data from the feedback data based on the feedback parameters to generate a feedback report, encoding the feedback report in accordance with the resource allocation, and configuring the station to transmit the feedback report in accordance with the resource allocation.

In Example 44, the subject matter of any of Example 43 can optionally include where the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

In Example 45, the subject matter of Examples 43 or 44 can optionally include decoding a second TF including second feedback parameters for the station and a second resource allocation for the station to transmit a second feedback report to the wireless device, extracting data from the feedback data based on the second feedback parameters to generate a second feedback report, encoding the second feedback report in accordance with the resource allocation, and configuring the station to transmit the second feedback report in accordance with the second resource allocation.

In Example 46, the subject matter of any of Examples 43-45 can optionally include where the resource allocation indicates a multi-user resource allocation in accordance with one or both of multi-user multiple-input multiple-output (MU-MIMO) or orthogonal frequency division multiple access (OFDMA).

Example 47 is an apparatus of a station, the apparatus including: means for decoding a null data packet (NDP) announcement (NDP-A) including an indication of the station, means for decoding a high-efficiency (HE) NDP, means for determining a feedback data based on the HE-NDP, means for decode a trigger frame (TF) including feedback parameters for the station and a resource allocation for the station to transmit a feedback report to the wireless device, means for extracting data from the feedback data based on the feedback parameters to generate a feedback report, means for encoding the feedback report in accordance with the resource allocation, and means for configuring the station to transmit the feedback report in accordance with the resource allocation.

In Example 48, the subject matter of Example 47 can optionally include where the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

In Example 49, the subject matter of Examples 47 or 48 can optionally include means for decoding a second TF including second feedback parameters for the station and a second resource allocation for the station to transmit a second feedback report to the wireless device, means for extracting data from the feedback data based on the second feedback parameters to generate a second feedback report, means for encoding the second feedback report in accordance with the resource allocation, and means for configuring the station to transmit the second feedback report in accordance with the second resource allocation.

In Example 50, the subject matter of any of Examples 47-49 can optionally include where the resource allocation indicates a multi-user resource allocation in accordance with one or both of multi-user multiple-input multiple-output (MU-MIMO) or orthogonal frequency division multiple access (OFDMA).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device comprising: a memory; and processing circuitry coupled to the memory, wherein the processing circuitry is configured to:
    encode a null data packet (NDP) announcement (NDP-A) comprising an indication of one or more stations;
    configure the wireless device to transmit the NDP-A;
    encode a high-efficiency (HE) NDP;
    configure the wireless device to transmit the HE-NDP;
    encode a first trigger frame (TF) comprising first feedback parameters for the one or more stations and first resource allocations for the one or more stations to transmit first feedback reports to the wireless device;
    configure the wireless device to transmit the first trigger frame;
    decode the first feedback reports from the one or more stations in accordance with the first resource allocations, wherein the first feedback reports are based on the first feedback parameters and the HE NDP;
    determine second feedback parameters for one or more of the one or more stations, wherein the second feedback parameters for a station are determined based on a corresponding first feedback report from the station and the first feedback parameters;
    encode a second TF comprising the second feedback parameters and second resource allocations for the one or more stations to transmit second feedback reports to the wireless device;
    configure the wireless device to transmit the second trigger frame; and
    decode second feedback reports from the one or more of the one or more stations in accordance with the second resource allocations, wherein the second feedback reports are based on the second feedback parameters and the HE-NDP.

2. The apparatus of claim 1, wherein the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

3. The apparatus of claim 1, wherein the second feedback parameters comprise at least one of the following: a narrower bandwidth than the feedback parameters, a smaller grouping (Ng) with respect to OFDM tones, or a different report type.

4. The apparatus of claim 1, wherein the first resource allocations and the second resource allocations indicate a multi-user resource allocation in accordance with one or both of multi-user multiple-input multiple-output (MU-MIMO) or orthogonal frequency division multiple access (OFDMA).

5. The apparatus of claim 1, wherein the processing circuitry is further configured to:
    determine the first resource allocations based on a size of the first feedback reports and the second resource allocations based on a size of the second feedback reports.

6. The apparatus of claim 1, wherein the NDP-A farther comprises third feedback parameters and wherein the first feedback reports are further based on the third feedback parameters.

7. The apparatus of claim 1, wherein the processing circuitry is farther configured to:
    configure the wireless device to transmit the first trigger frame a short inter-frame space (SIFS) after the HE-NDP.

8. The wireless apparatus of claim 1, wherein the wireless device and each of the one or more stations are one or more from the following group: an access point, an Institute of Electrical and Electronic Engineers (IEEE) 802.1 lax access point, a station, a station acting as a group owner (GO), and an IEEE 802.1 lax station, and wherein the trigger frame is one from the following group: a trigger frame, a request-to-send (RTS) frame comprising an indication that the RTS frame is a trigger frame, and a trigger frame for sounding.

9. The apparatus of claim 1, further comprising transceiver circuitry coupled to the memory.

10. The apparatus of claim 9, further comprising one or more antennas coupled to the transceiver circuitry.

11. The apparatus of claim 10, wherein the processing circuitry is configured to: transmit the HE-NDP over a bandwidth as a multicast frame, wherein the bandwidth is one from the following group: 20 MHz, 40 MHz, 80 MHz, 160 MHz, and 320 MHz.

12. A non-transitory computer-readable storage medium that stores instructions for execution by one or more processors, the instructions to configure the one or more processors to cause a wireless device to:
    encode a null data packet (NDP) announcement (NDP-A) comprising an indication of one or more stations;
    configure the wireless device to transmit the NDP-A;
    encode a high-efficiency (HE) NDP;
    configure the wireless device to transmit the HE-NDP;
    encode a first trigger frame (TF) comprising first feedback parameters for the one or more stations and first resource allocations for the one or more stations to transmit first feedback reports to the wireless device;
    configure the wireless device to transmit the first trigger frame;
    decode the first feedback reports from the one or more stations in accordance with the first resource allocations, wherein the first feedback reports are based on the first feedback parameters and the HE NDP;

determine second feedback parameters for one or more of the one or more stations, wherein the second feedback parameters for a station are determined based on a corresponding first feedback report from the station and the first feedback parameters;

encode a second TF comprising the second feedback parameters and second resource allocations for the one or more stations to transmit second feedback reports to the wireless device;

configure the wireless device to transmit the second trigger frame; and decode second feedback reports from the one or more of the one or more stations in accordance with the second resource allocations, wherein the second feedback reports are based on the second feedback parameters and the HE-NDP.

13. The non-transitory computer-readable storage medium of claim 12, wherein the feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

14. The non-transitory computer-readable storage medium of claim 12, wherein the wireless device and each of the one or more stations are one or more from the following group: an access point, an Institute of Electrical and Electronic Engineers (IEEE) 802.11ax access point, a station, a station acting as a group owner (GO), and an IEEE 802.11ax station, and wherein the trigger frame is one from the following group: a trigger frame, a request'-to-send (RTS) frame comprising an indication that the RTS frame is a trigger frame, and a trigger frame for sounding.

15. An apparatus of a station comprising: a memory; and processing circuitry couple to the memory, wherein the processing circuitry is configured to:

decode a null data packet (NDP) announcement (NDP-A) comprising an indication of the station;

decode a high-efficiency (HE) NDP;

determine a feedback data based on received signals of the HE-NDP;

decode a first trigger frame (TF) comprising first feedback parameters for the station and a first resource allocation for the station to transmit a first feedback report to a wireless device;

generate a first feedback report based on the feedback data and on the first feedback parameters;

encode the first feedback report in accordance with the first resource allocation;

configure the station to transmit the first feedback report in accordance with the first resource allocation;

decode a second TF comprising second feedback parameters for the station and a second resource allocation for the station to transmit a second feedback report to the wireless device;

determine a second feedback report based on the second feedback parameters, the first feedback report, and the feedback data;

encode the second feedback report in accordance with the second resource allocation; and configure the station to transmit the second feedback report in accordance with the second resource allocation.

16. The apparatus of claim 15, wherein the first feedback parameters and the second feedback parameters comprise one or more from the following group: channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

17. The apparatus of claim 15, wherein the first resource allocation indicates a multi-user resource allocation in accordance with one or both of multi-user multiple-input multiple-output (MU-MIMQ) or orthogonal frequency division multiple access (OFDMA).

18. The apparatus of claim 15, further comprising transceiver circuitry coupled to the memory; and, one or more antennas coupled to the transceiver circuitry.

19. A method performed by an apparatus of an wireless device, the method comprising;

encoding a null data packet (NDP) announcement (NDP-A) comprising an indication of one or more stations;

configuring the wireless device to transmit the NDP-A;

encoding a high-efficiency (HE) NDP;

configuring the wireless device to transmit the HE-NDP;

encoding a first trigger frame (TF) comprising first feedback parameters for the one or more stations and first resource allocations for the one or more stations to transmit first feedback reports to the wireless device;

configuring the wireless device to transmit the first trigger frame;

decoding the first feedback reports from the one or more stations in accordance with the first resource allocations, wherein the first feedback reports are based on the first feedback parameters and the HE NDP;

determining second feedback parameters for one or more of the one or more stations, wherein the second feedback parameters for a station are determined based on a corresponding first feedback report from the station and the first feedback parameters;

encoding a second TF comprising the second feedback parameters and second resource allocations for the one or more stations to transmit second feedback reports to the wireless device;

configuring the wireless device to transmit the second trigger frame; and decoding second feedback reports from the one or more of the one or more stations in accordance with the second resource allocations, wherein the second feedback reports are based on the second feedback parameters and the HE-NDP.

20. The method of claim 19, wherein the first feedback parameters and the second feedback parameters comprise one or more from the following group; channel station information (CSI) bandwidth (BW), report type of signal to noise ratio (SNR) estimations, report type of steering matrices estimations, report type of SNR estimates and steering matrices estimations, a grouping (Ng) with respect to orthogonal frequency division multiplexing (OFDM) tones, and a number of spatial streams (Nc) to report on.

21. The apparatus of claim 1, wherein the memory is configured to store the first feedback parameters.

22. The apparatus of claim 1, wherein the memory is configured to store the feedback data.

* * * * *

UNITED STATES PATENT AND TRADEMARK OFFICE
CERTIFICATE OF CORRECTION

PATENT NO. : 10,057,908 B2  
APPLICATION NO. : 15/078677  
DATED : August 21, 2018  
INVENTOR(S) : Sutskover et al.

Page 1 of 1

It is certified that error appears in the above-identified patent and that said Letters Patent is hereby corrected as shown below:

In the Claims

Column 19, Line 45, Claim 1, delete "HE NDP;" and insert --HE-NDP;-- therefor

Column 19, Line 64, Claim 2, delete "(CS1)" and insert --(CSI)-- therefor

Column 20, Line 34, Claim 8, delete "802.1 lax" and insert --802.11ax-- therefor Column 20, Line 36, Claim 8, delete "802.1 lax" and insert --802.11ax-- therefor Column 20, Line 45, Claim 11, after "to:", insert --¶--

Column 20, Line 67, Claim 12, delete "HE NDP;" and insert --HE-NDP;-- therefor

Column 21, Line 34, Claim 14, delete "request'-to-send" and insert --request-to-send-- therefor Column 22, Line 13, Claim 17, delete "(MU-MIMQ)" and insert --(MU-MIMO)-- therefor Column 22, Line 20, Claim 19, delete "comprising;" and insert --comprising:-- therefor Column 22, Line 35, Claim 19, delete "HE NDP;" and insert --HE-NDP;-- therefor Column 22, Line 54, Claim 20, delete "group;" and insert --group:-- therefor Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*